US006188536B1

(12) United States Patent
Chliwnyi

(10) Patent No.: US 6,188,536 B1
(45) Date of Patent: Feb. 13, 2001

(54) METHOD AND SYSTEM FOR DETECTING THE END OF A TAPE WITHIN A MAGNETIC TAPE DRIVE

(75) Inventor: Alex Chliwnyi, Tucson, AZ (US)

(73) Assignee: International Business Machines Corporation, Armonk, NY (US)

( * ) Notice: Under 35 U.S.C. 154(b), the term of this patent shall be extended for 0 days.

(21) Appl. No.: 09/105,615

(22) Filed: Jun. 26, 1998

(51) Int. Cl.[7] ................................................. G11B 15/093
(52) U.S. Cl. ......................................... 360/74.3; 360/72.3
(58) Field of Search ........................... 360/72.3, 71, 72.1, 360/74.1, 74.2, 74.3

(56) References Cited

U.S. PATENT DOCUMENTS

| 4,389,600 | 6/1983 | Milligan et al. |
| 4,399,936 | 8/1983 | Rueger . |
| 5,309,300 | 5/1994 | Lee ..................................... 360/74.2 |
| 5,576,905 | 11/1996 | Garcia et al. . |

FOREIGN PATENT DOCUMENTS 62-8348    1/1987  (JP) .

OTHER PUBLICATIONS

US4242708, Dreiling, J.A., Abstract, Dec. 1980.
EP198693A, Abstract, No author, Oct., 1986.
DE3626940A, Rademacher et al., Abstract, Feb., 1988.

Primary Examiner—Hoa T. Nguyen
Assistant Examiner—James L Habermehl
(74) Attorney, Agent, or Firm—Robert M. Sullivan; Felsman, Bradley, Vaden, Gunter & Dillon, LLP

(57) ABSTRACT

A method and system for detecting the end of a tape within a tape drive system, wherein the tape drive system includes a take-up reel and a supply reel upon which the tape is wound. The tape is driven through the tape drive system at a closed loop velocity. A tension transducer located in a path of the tape is utilized to monitor a tension associated with the tape while the tape is being driven through the tape drive system at the closed loop velocity. The tension transducer is utilized to detect the end of the tape. The take-up reel is then moved through a predetermined arc of rotation, in response to a cessation of the driving of the tape through the tape drive system. A confirmation is then provided that the end of tape has been detected, in response to a particular output of the tension transducer. Verification that the end of the tape has been achieved is provided, in response to an output of a tachometer attached to the take-up reel, while moving the take-up reel through a predetermined arc of rotation, if the output of the tachometer is at least equal to a predetermined threshold parameter.

12 Claims, 8 Drawing Sheets

METHOD AND SYSTEM FOR DETECTING THE END OF A TAPE WITHIN A MAGNETIC TAPE DRIVE

BACKGROUND OF THE INVENTION

1. Technical Field

The present invention relates in general to information-retrieval methods and systems. In particular, the present invention relates to magnetic media. More particularly, the present invention relates to magnetic tape drive systems. Still more particularly, the present invention relates to methods and systems for detecting the end of magnetic storage tapes within magnetic tape drive systems.

The present invention is additionally related to motion and positional control of magnetic tape in a reel-to-reel tape drive. Such control of magnetic tape motion and position in reel-to-reel tape drives is described in detail in U.S. Pat. No. 4,015,799 and U.S. Pat. No. 4,125,881, both assigned to the assignee of this application and incorporated herein by reference in their entireties.

2. Description of the Related Art

Magnetic tape drives are commonly utilized for controlling the movement of magnetic tape past a read or write head, and/or to allow automatic rewinding. Magnetic tape, usually referred to simply as "tape," is typically composed of a thin strip of polyester film coated tape with a magnetizable layer on which data can be stored. Because the tape includes a continuous length of data storage material and because the read/write head on a magnetic tape drive cannot simply "jump" to a desired point on the tape without the tape first being advanced to that point, the tape must be read or written sequentially, not randomly, as is typically accomplished with floppy or hard disks.

Most tape drives to date have been designed for relatively thick media (i.e., thick tape). In a typical tape drive, the end of a tape being driven through the tape drive is detected by literally running off the end of the tape. The tape itself is physically utilized to pull a pantocam pin out of the reel upon which the tape is wound and a sensor is then activated to indicated that the end of the tape has been reached. Such techniques function properly with thick "beefy" tape, but is inefficient when utilized with thinner tape. Such thinner tape is increasingly being utilized to store and record data. Utilizing these old techniques for detecting the end of the tape causes undue wear on the pantocam linkage, contributing to high pantocam field replacement rates. In addition, too much stress is placed on thinner tape when utilizing such end-of-tape detection techniques.

In the process of reading or writing data on a magnetic tape, an uncertainty in position results from tape stretching and the entrainment of air in the wraps of tape on the reels. A motion from end to end can result in an uncertainty of several meters of tape. Consequently, the tape position measured by the counters connected to tachometers on the reel motors can not be used to reliably predict the end of tape. In prior art tape drives, a simple mechanism solved this problem. A flag on the tape threading mechanism (i.e. the pantocam) was utilized to break an optical sensor in order to signal a control processor that the pantocam was in the position where the leader block attached to the tape was fully inserted in the take up reel. To find the end of the tape, the pantocam motor was run for a short period of time in order to create some slop in the pantocam gearbox through backlash in the gears.

The end of the tape was found by rewinding tape from a take-up reel back to the supply reel in the cartridge under velocity control. The indication that the end of the tape was reached was provided when the optical sensor on the pantocam became active as the flag on the pantocam arm was jerked out of the sensor as the end of the tape was reached and the pantocam abruptly yanked away from the take-up reel. Such a system operated successfully as long as the mechanical strength of the tape was reliable to yank the pantocam arm and the lead block out of the take-up reel spool.

Based on the foregoing, it can be appreciated that a need exists for a method and system which overcomes the problems associated with prior art tape drive systems, namely the inability to properly detect the end of tape within a tape drive system, without damaging the tape itself, particularly thin tape which does not possess the mechanical strength to repeatedly pull out the pantocam for thousands of load/unload cycles. A need also exists for a method and system which would detect the end of tape within a tape drive system utilizing a single reel cartridge, while reducing undue wear on the pantocam caused by an abrupt jerk when the end of tape is finally detected. A need also exists for a method and system which verifies that the end of tape has been reached and the tape can be successfully unthreaded without damaging the tape.

SUMMARY OF THE INVENTION

It is therefore an object of the invention to provide an improved information-retrieval method and system.

It is another object of the invention to provide an improved magnetic tape drive system.

It is still another object of the invention to provide an improved method and system for detecting the end of magnetic storage tapes within magnetic tape drive systems.

The above and other objects are achieved as is now described. A method and system for detecting the end of a tape within a tape drive system, wherein the tape drive system includes take-up reel and a supply reel upon which the tape is wound. The tape is driven through the tape drive system at a closed loop velocity. The tension transducer is utilized to detect the end of the tape. The take-up reel is then moved through a predetermined arc of rotation, in response to a cessation of the driving of the tape through the tape drive system. A confirmation is then provided that the end of tape has been detected, in response to a particular output of the tension transducer. Verification that the end of the tape has been achieved is provided, in response to an output of a tachometer attached to the take-up reel, while moving the take-up reel through a predetermined arc of rotation, if the output of the tachometer is at least equal to a predetermined threshold parameter.

The method and system for detecting the end of a tape within a tape drive system utilizes a tape cartridge with a single reel. A relatively high speed search for the end of the tape can be performed because the end of tape is sensed by observing the output of the tension transducer and determining that the tape has reached the end via a test for increased tension. At the same time, the tension transducer is monitored for a drop in tension, indicating a broken tape. When an increase in tension is detected, the tape motion is stopped by applying braking currents to reel motors and initiating a closed loop tension control to minimize tension transients.

After motion in the tape and the reels settle down, and the take-up reel is moved through the predetermined arc of rotation, the motion of both the supply reel and take-up reel is measured with attached tachometers. The motion of these two reels is checked utilizing knowledge of the geometry of the tape path to verify that the take-up reel is free to move, while there is no motion in the supply reel. If this test fails, the operation is retried a prescribed number of times in order to find the end of the tape. If successful, an unthread operation is allowed to take place.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 7(b) illustrates the continuation of the flowchart depicted in FIG. 7(a), in accordance with a preferred embodiment of the present invention.

DETAILED DESCRIPTION OF PREFERRED EMBODIMENT

Figure 1:
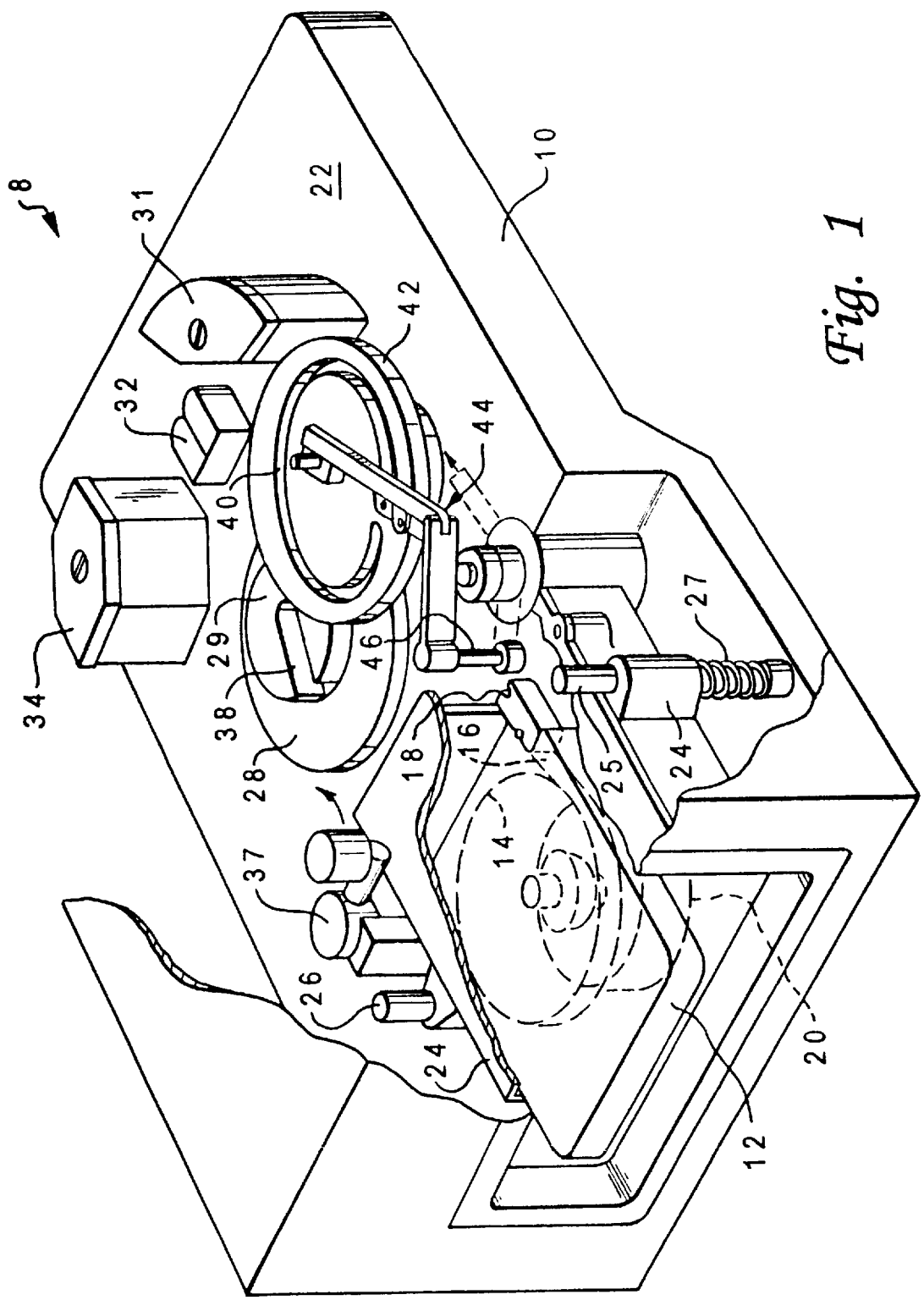
FIG. 1 is a perspective view of a tape drive system which may be utilized in accordance with a preferred embodiment of the present invention.

With reference now to the figures and in particular with reference to FIG. 1, there is depicted a schematic diagram of a tape drive system 8 which may be utilized in accordance with a preferred embodiment of the present invention. FIG. 1 is a perspective view of tape drive system 8. Tape drive system 8 includes a base plate 10 on which various standard components of a magnetic tape transport may be mounted. A supply cartridge 12 is replaceable and includes a reel 14 of magnetic tape 16. A leader block 18 is disposed externally of the cartridge. The leading edge of magnetic tape 16 is attached to the side of leader block 18.

A drive motor 20 for the supply reel 14 is mounted beneath base plate 10 so that its shaft extends normal to the surface and slightly above surface 22 of base plate 10. The motor shaft is provided with a suitable clutching arrangement which permits the motor to be coupled to the hub of the supply reel 14 by movement of the cartridge 12 in a direction normal to the surface 22. As shown, this vertical movement is achieved by the cartridge loading mechanism, a portion of which is designated by reference character 24, along shafts 25 and 26 against springs mounted on the shafts, one shown at reference numeral 27. Magnetic tape 16 passes an air bearing guide 31, a magnetic transducer head 32, and a second air bearing guide 34.

Figure 2:
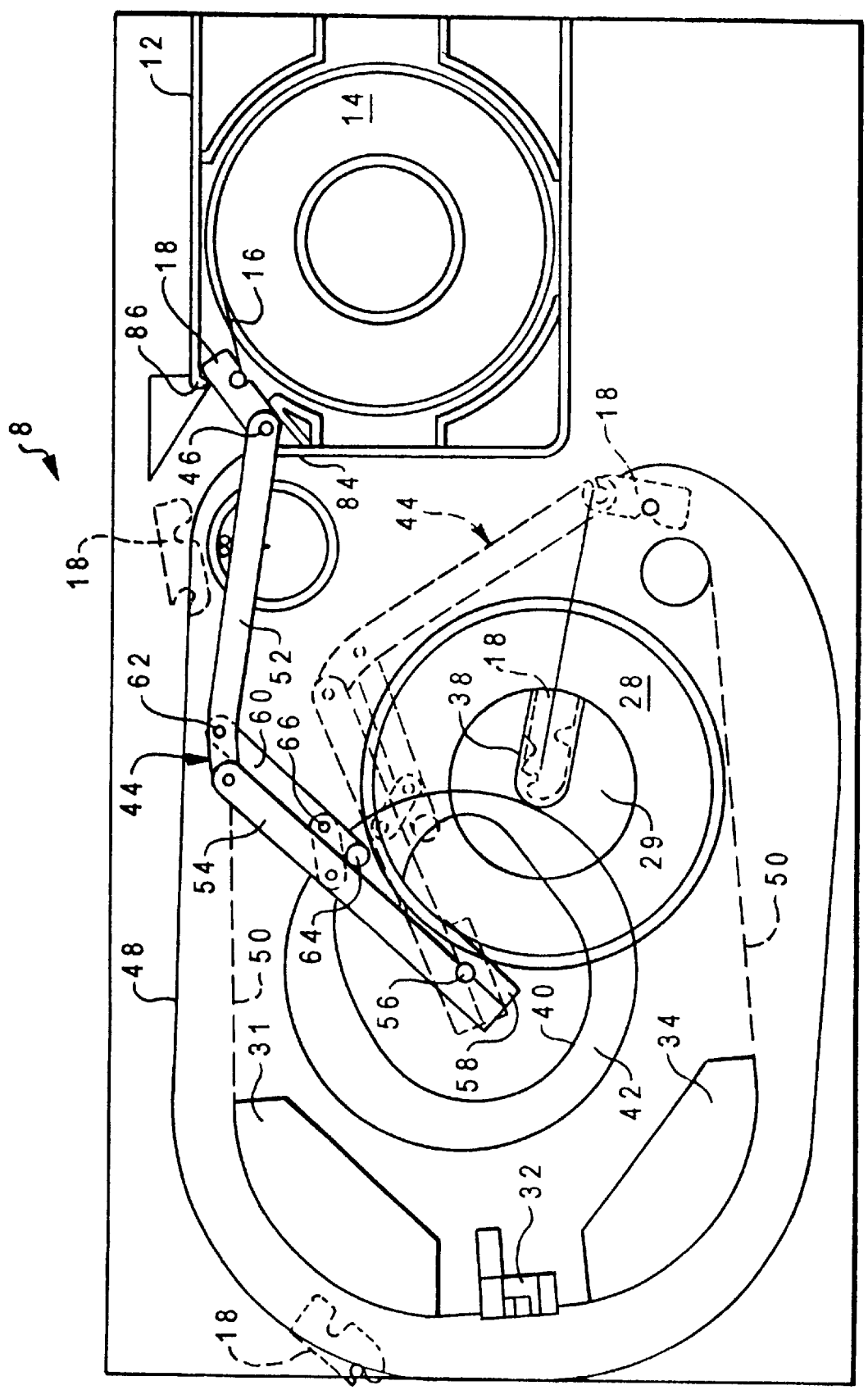
FIG. 2 is top plan view of the tape drive system of FIG. 1, in accordance with a preferred embodiment of the present invention.

FIG. 2 is top plan view of tape drive system 8 of FIG. 1, showing two positions of an arm 44. In FIG. 1 and FIG. 2, like parts are indicated by like reference numerals. In FIG. 2, the first position in solid line shows arm 44 in contact with a leader block 18. In this position, arm 44 through threading pin 46 is ready to pull leader block 18 out of cartridge 12 from supply reel 14. Arm 44 is shown in dashed lines as arm 44 is directing leader block 18. In the dashed line position, arm 44 is in the position of preparing to place the leader block 18 into slot 38 in hub 29 of take-up reel 28. Again, leader block 18 is shown in phantom lines in slot 38. Likewise, several positions of leader block 18 are illustrated in phantom positions along a path of leader block 18, depicted as a line identified by reference numeral 48. The magnetic tape 16 takes the path shown in the dashed lines identified by reference numeral 50.

Thus, FIG. 1 illustrates a cartridge 12 that has a leader block 18 attached to a supply reel 14. The threading pin 46 picks up leader block 18 and takes it about the magnetic tape path as shown by the multiple positions of leader block 18. Threading pin 46 then inserts leader block 18 in take-up reel 29. A flag is located on arm 44 that blocks a sensor (not shown) when leader block 18 is fully inserted in take-up reel 29. The sensor informed tape drive system 8 when the end of the tape was reached. Such a sensor is not necessary to practice a preferred embodiment of the present invention and is described herein for illustrative purposes only, in order to present a better understanding of the present invention.

FIG. 2 additionally illustrates a follower linkage 52 which has threading pin 46 attached to it at one end. The opposite end of follower linkage 52 is pivotally connected to a shaft linkage 54. Shaft linkage 54 is connected for a sweeping motion to a shaft 56 by a connecting block 58. Shaft 56, together with a motor (not shown in FIG. 2) attached to shaft 56 provide the sweeping motion to the shaft linkage for pulling the leader block 18 and the magnetic tape 16 through tape drive system 8. Follower linkage 52, together with the shaft linkage 54, form a broken arm linkage between shaft 56 and threading pin 46.

Cam linkage 60 is pivotally connected at point 62 to follower linkage 52. A follower bearing 64 is pivotally connected to the opposite end of cam linkage 60. The follower bearing 64 fits into cam groove 40. A connecting linkage 66 pivotally interconnects cam linkage 60 to shaft linkage 54. Connecting linkage 66 causes cam linkage 60 to be pulled through the sweeping motion when shaft 56 rotates, which causes shaft linkage 54 to sweep through tape drive system 8. Follower bearing 64 will follow cam groove 40 with cam linkage 60, thereby determining the extension of follower linkage 52 as follower bearing 64 follows the outline of cam groove 40.

Tension transducer 37 measures the amount of tension on the tape as a result of take-up and supply reel motors pulling on the tape. Tension transducer 37 is an air pressure sensor having several holes that the tape "covers up" as the tape is driven through tape drive system 8. The tighter the tape is pulled down on tension transducer 37, the less air leaks out of the holes and the higher the pressure in the tension transducer assembly. The tension transducer produces a voltage proportional to the tension on the tape. Increasing tension produces an increase in voltage. It is such a tension transducer that may be utilized, according to a preferred embodiment of the present invention, to monitor a tension associated with the magnetic tape while the magnetic tape is being driven through a tape drive system, such as tape drive system 8, at a closed loop velocity.

Figure 3:
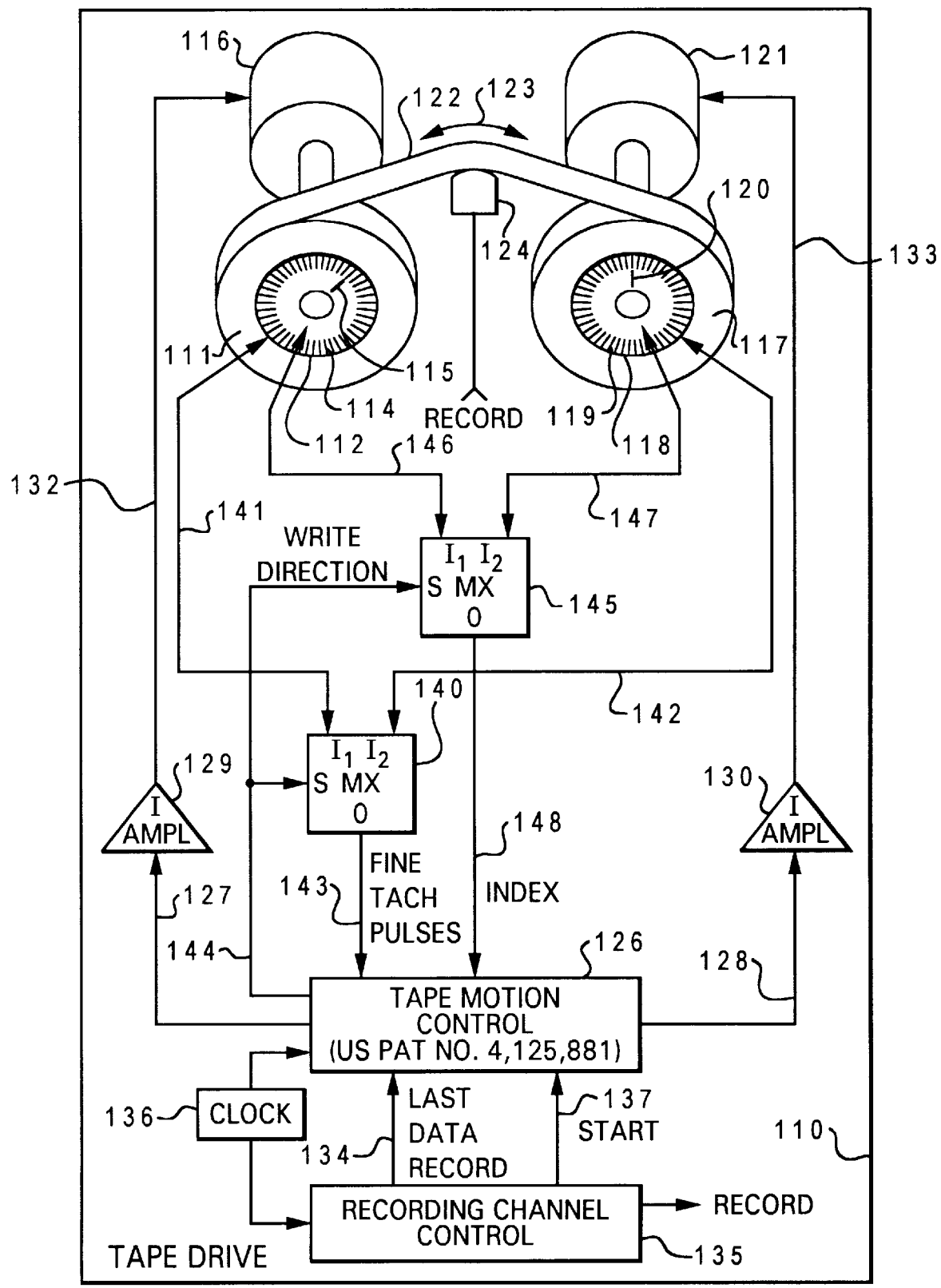
FIG. 3 illustrates a logical schematic diagram illustrative of a tape motion control unit, which may be utilized in accordance with a preferred embodiment of the present invention.

FIG. 3 illustrates a logical schematic diagram illustrative of a tape motion control unit, which may be utilized in accordance with a preferred embodiment of the present invention. FIG. 3 is presented to illustrate an example of a tape motion control system that may be utilized in accordance with a preferred embodiment of the present invention. FIG. 3 depicts reel-to-reel tape servo control. FIG. 3, however, does not depict a system for detecting the end of tape. The tape motion control system of FIG. 3 is described and illustrated herein for illustrative purposes only. The tape motion control system of FIG. 3 can be implemented in accordance with a preferred embodiment of the present invention to provide tape motion control utilized when detecting an end of tape.

Tape motion control as used herein connotes the specific procedures and apparatuses described in incorporated U.S. Pat. No. 4,124,881 in which control of tape position and motion in a reel-to-reel tape drive is implemented by a tape radius constant corresponding to the actual length and thickness of the tape. The tape radius constant is calculated in a servo algorithm for controlling rotation of both reels in the tape drive. The inputs to the servo algorithm are tachometer pulses obtained from tachometers which engage reel motor drive shafts.

The configuration depicted in FIG. 3 is based upon the critical realization that deriving tape motion control parameter values using fine line tachometer pulses obtained from a take-up reel fail to account for air entrainment in the outermost layers of tape on the take-up reel. The solution provided by the invention is to provide a fine-line tachometer on each motor drive shaft of a bi-directional reel-to-reel tape drive and to select fine-line tachometer pulses from the reel which supplies the tape during writing. Necessarily, the system depicted in FIG. 3 provides for switching from one tachometer to the other when the write direction is reversed.

Thus, the invention presented herein can be understood with reference to FIG. 3, where a bi-directional reel-to-reel tape drive 110 includes a pair of reels, 111 and 117, each driven by a respective motor, 116 and 121. Mounted to the drive shaft of each of the motors 116 and 121 is a fine-line tachometer 112 and 118, with an outer circular array of fine tachometer lines 114, 119, and an index line, 115, 120 displaced radially inward on a respective coding wheel from the fine-line array. A magnetic tape 122 is wound to the reels 111, 117 and the motors 116, 121 are controlled to move the tape 122 for recording and playback in either of the two directions indicated by the arrows 123.

Each of the tachometers 112, 118 function as a tape motion sensor; each emits a single pulse in response to an index to signify completion of a relatively large preselected angle, preferably 360 degrees, that is, once per revolution of the reels 111, 117. In addition, each of the tachometers 112, 118 generates a two-phase tachometer signal comprising two phase-displaced pulse streams. The fine-line tachometer arrays on the tachometers 112, 118 are identical, each emitting N pulses during each revolution of respective reels 111, 117.

Assume the magnetic tape 122 is being advanced from the reel 111 to the reel 117 for recording data through a magnetic write/read record head 124 positioned between the reels 111 and 117 in engagement with a recording surface of the magnetic tape 122. Relatedly, the reel 111 is the "supply" reel while the reel 117 is the "take-up" reel. (Reels 111 and 117 are respectively analogous to supply reel 14 and take-up reel 28 of FIG. 1 and FIG. 2.)

Assume now that a complete longitudinal track of data has been written on magnetic tape 122 while the magnetic tape is being fed from reel 111 (i.e. supply reel) to reel 117 (i.e., take-up reel). In order to continue recording without rewinding the magnetic tape, the direction of tape motion is reversed while recording continues, that is data is written while the magnetic tape is advanced from reel 117 (which now becomes the supply reel) to reel 111(now, the take-up reel). Another complete longitudinal track of data, parallel to the first data track, is written on the tape, and the tape motion is once again reversed, and so on.

During advancement of magnetic tape 122, various parameters, such as tape motion, position, tension are monitored in order to derive motor currents having the polarity and magnitude necessary to operate the motors 116, 121, while recording data on magnetic tape 122. These currents may be derived by the algorithm of the incorporated '881 patent in response to fine tachometer line and tachometer index signals which are fed to a tape motion control unit 126. The tape motion control unit 126 processes the fine tachometer and index pulses, generating currents for the motors 116 and 121 on respective current lines 127 and 128. The signals on the current lines 127 and 128 are amplified at 129 and 130, respectively, and amplified motor currents are conducted to the motors 116, 121 on the outputs 132, 133.

The tape motion control unit 126 operates to maintain the motors 116 and 121 at constant nominal velocities for recording, reading, and searching. In addition, the tape motion control unit 126 controls the motors 116 and 121 to perform the back hitch operation described above in response to a signal indicated the last data recording on signal line 134, which is provided by a recording channel control unit 135. Recording channel control unit 135 provides a RECORD signal for driving the magnetic write/read head 124 and also generates signals for synchronizing recording operations with tape motion, one of the signals indicating the writing of a last data record. A clock unit 136 provides clock pulses to the tape motion control unit 126 and the recording channel control unit 135 for synchronization of their operations.

Figure 4:
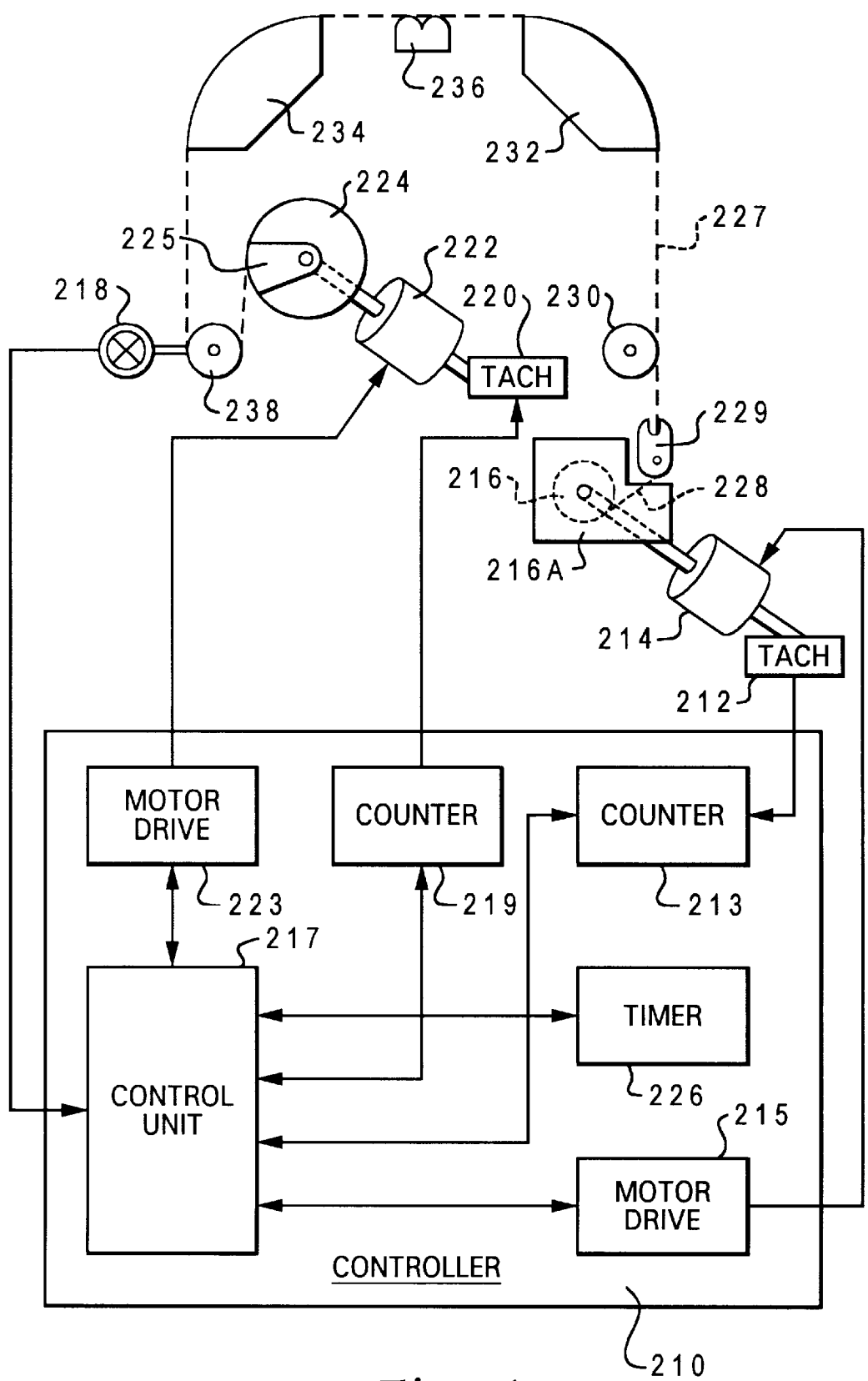
FIG. 4 illustrates a pictorial representation of a tape drive path which may be utilized in accordance with a preferred embodiment of the present invention.

FIG. 4 illustrates a pictorial representation of a tape drive path which may be utilized in accordance with a preferred embodiment of the present invention. As depicted in FIG. 4, a controller 210 accepts information from a supply reel motor 214. The supply reel motor 214 is driven by a motor drive circuit 215 to reversibly rotate a supply reel 216 shown located within a single reel cartridge 216A. The tachometer 212 directs count pulses to a counter 213 to indicate the number of rotations and the rotational position of the motor 214 and the supply reel 216. The output of the counter 213 is directed to a control unit 217.

The control unit 217 is analogous to the control unit 126 of FIG. 3. Reference is again made to the aforementioned U.S. Pat. No. 4,125,881 for a more complete description of a control circuit that may be utilized for a reel-to-reel tape drive. Control unit 217 also provides the control for keeping the required tension in the tape and thus the output from a tension transducer 218 is also directed to the control unit 217. Tension transducer 218 is one form of a tension transducer that may be utilized in accordance with a preferred embodiment of the present invention. Those skilled in the art will of course appreciate that other types of tension transducers may be utilized in accordance with a preferred embodiment of the present invention.

Another input to control unit 217 is implemented via a counter 219 that accepts count pulses from a take-up reel tachometer 220. The tachometer 220 is connected to a take-up reel motor 222 that is reversibly driven by a motor drive 223 applied torque under control of the control unit 217. The motor 222 drives a take-up reel 224. A timer 226 may be included in the controller 210 to control the application of the motor drive 215 power to the motor 214. The time 226 is controlled by the control unit 217. A magnetic tape 228 takes a path, shown by a dotted line 227, from supply reel 216 to take-up reel 224 past an idler bearing 230, air bearing tape guides 232 and 234 and a magnetic head 236. The tape path 227 continues around an air bearing guide 238 of the tension transducer 218 to the take-up reel 224.

The controller 210, after the entry of a supply reel 216 onto a clutch drive (not shown), activates motor 214 through the motor drive unit 215 and the control unit 217 into a reverse or reeling direction to first take up any slack in the tape 228 in supply reel 216 against a leader block 229, and then to apply a reverse higher current drive to the motor 214 for a period of time determined by timer 226 while checking the output of the tachometer 212 to sense any reverse rotation of the supply reel 216 against the tape 228 as held by the leader block 229. If the control unit 217 does not sense a sufficient number of count pulses from the tachometer 212 as stored in the counter 213, this means that the tape 228 on the supply reel 216 has not changed characteristics and is wrapped in a tight enough fashion to permit good operation of the reel-to-reel drive.

If, however, the tachometer 212 sends out a sufficient number of count pulses signifying that tape 228 on supply reel 216 is not tight enough and that supply reel 216 actually made a reverse motion against the end of tape 228 held by leader block 229, the control unit 217 will direct a threading operation which will pull leader block 229 and tape 228 through tape path 227 onto take-up reel 224. Leader block 229 nestles in a cutout 225 in take-up reel 224. Take-up reel motor 222 is activated through motor drive 223 to unwind all of tape 228 from supply reel 216 under the control of the control unit 217.

Thus, according to a preferred embodiment of the present invention, an operation is performed in which a search is made for the end of tape 228, followed by a verification that the end of the tape 228 has in fact been found. Tape 228 is then unthreaded, and leader block 229 is put in the tape cartridge (e.g., single reel cartridge 216A). The tape cartridge is then unloaded. Tape 228 is initially unwound from take-up reel 224 back into the tape cartridge while under tension and velocity control. If the tape tension drops below a predetermined tension threshold parameter for a predetermined period, then motion within the tape drive system simply stops. Both the take-up reel 224 and supply reel 216 come to a halt. In such an instance, an indication is provided that a "broken tape" has been encountered, because the tension is out of control and too low. Otherwise the tape tension is monitored and when one of the criteria are met, large currents are applied to the supply and take-up reels to "brake" the tape drive system and overcome the inertia of the system. The tape drive system enters a tension control mode in order to dampen a slight tension transient that has been created by running into the end of the tape. At this point, it is assumed that the tension increase is caused by reading the end of tape 228 and the inability of the servo loop formed to control tension any longer. This assumption however, must be verified and the operation retried if the end of tape 228 has not been reached due to false detection or degradation of the tape transport motor bearings.

To insure against false detection of the end of the tape, a further check can be performed which relies on the tape path geometry. In order to perform this test, it is necessary to look for a change in the relationship of the tape to take-up reel 224. Normally, the tape is tangent to take-up reel 224. Rotating take-up reel 224 through an arc of rotation results in the supply-reel rotating through an arc that is inversely proportional to the ration of the radii of the two supply and take-up reels when tape is positioned in the tape drive system and tape is under tension. When the end of tape 228 is reached, tape 228 is positioned perpendicular to take-up reel 224.

Moving take-up reel 224 through a small arc will not result in the proportional motion at supply reel 216. When the system has settled, take-up reel 224 is moved in a prescribed arc and the length of the arc is measured using a tachometer attached to take-up reel 224. Simultaneously, the arc traversed by supply reel 216 is measured by counters 213 and 219 of FIG. 4. During the motion and the measurement, supply reel 216 has a fixed current applied to it, so as to maintain tension and the connection between the two reels through the tape that the rest relies on. Thus, when tape 228 is at the end, take-up reel 224 can move through a small arc, while keeping the tape perpendicular to take-up reel 224 without causing appreciable motion in supply reel 216.

Figure 5:
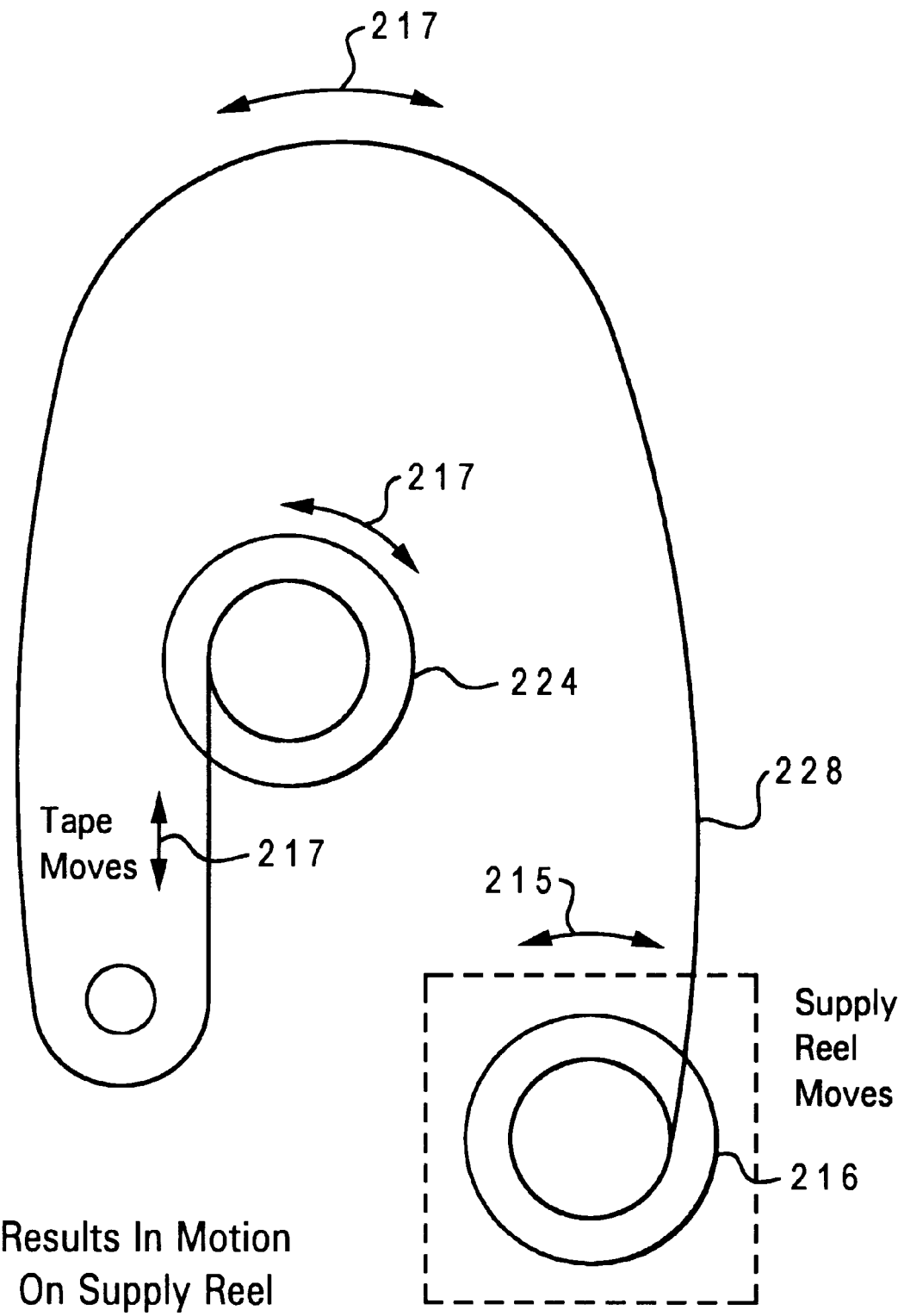
FIG. 5 is a schematic diagram illustrating a configuration in which motion results on the supply reel, in accordance with a preferred embodiment of the present invention.
Figure 6:
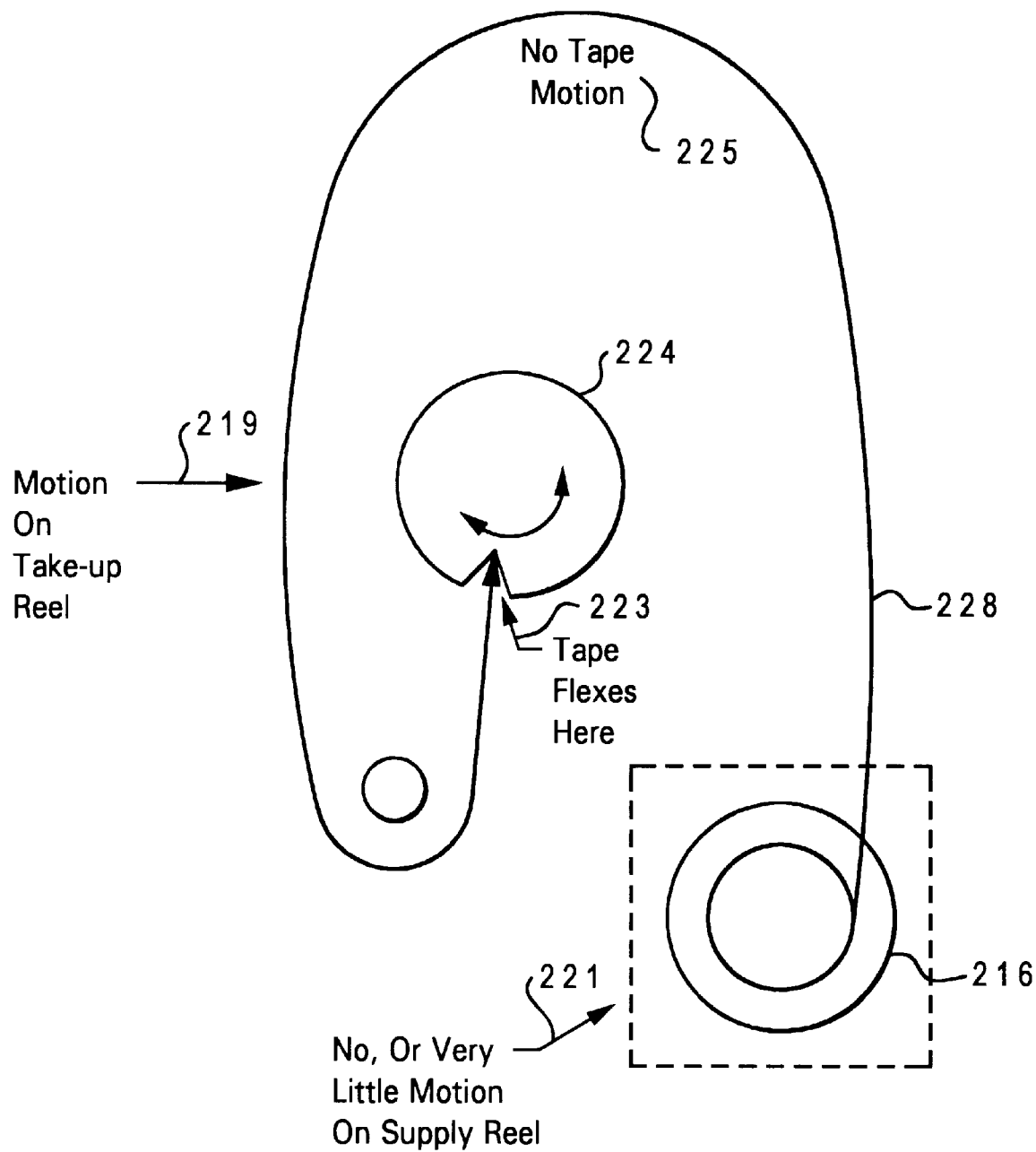
FIG. 6 is a schematic diagram illustrating a configuration in which little or no motion results on the supply reel, in accordance with a preferred embodiment of the present invention.

FIG. 5 and FIG. 6 illustrate the principals described above. FIG. 5 is a schematic diagram illustrating a configuration in which motion results on the supply reel, in accordance with a preferred embodiment of the present invention. FIG. 6 is a schematic diagram illustrating a configuration in which little or no motion results on the supply reel, in accordance with a preferred embodiment of the present invention. In FIG. 4, FIG. 5, and FIG. 6, like parts are illustrated by like reference numerals. The relative radii of the two reels (i.e., supply reel 216 and take-up reel 224) are in an approximate 2 to 1 ratio. When almost all of the tape is in the cartridge, the radius of take-up reel 224 through an arc of rotation results in a number of tachometer counts. The tachometer counts for the cartridge, or supply reel 216, are approximately ½ of that number because the radius of supply reel 216 is twice the radius of take-up reel 224.

Motion is measured by recording the reading of the tachometer up/down counter registers in one position and subtracting the reading at the other end of the motion. If a sufficient delta in tachometer counts is achieved for take-up reel 224, one can conclude that take-up reel 224 moves freely. The delta in the tachometer counts for supply reel 216 is checked to verify that it moves freely only slightly. If either test fails, a re-try operation is performed for a prescribed number of times before signalling a failure to detect the end of tape. Arrows 217 indicate the path of tape motion in FIG. 5. In FIG. 5, motion exists on the take-up reel. Arrow 215 in FIG. 5 indicates that the supply reel 216 moves. In FIG. 6, no tape motion is evident, as indicated by reference numeral 225. Arrow 219 in FIG. 6 indicates motion on the take-up reel, while arrow 221 (also in FIG. 6) indicates no or very little motion on the supply reel 216. Arrow 223 in FIG. 6 indicates the point at which tape 228 flexes.

Figure 7A:
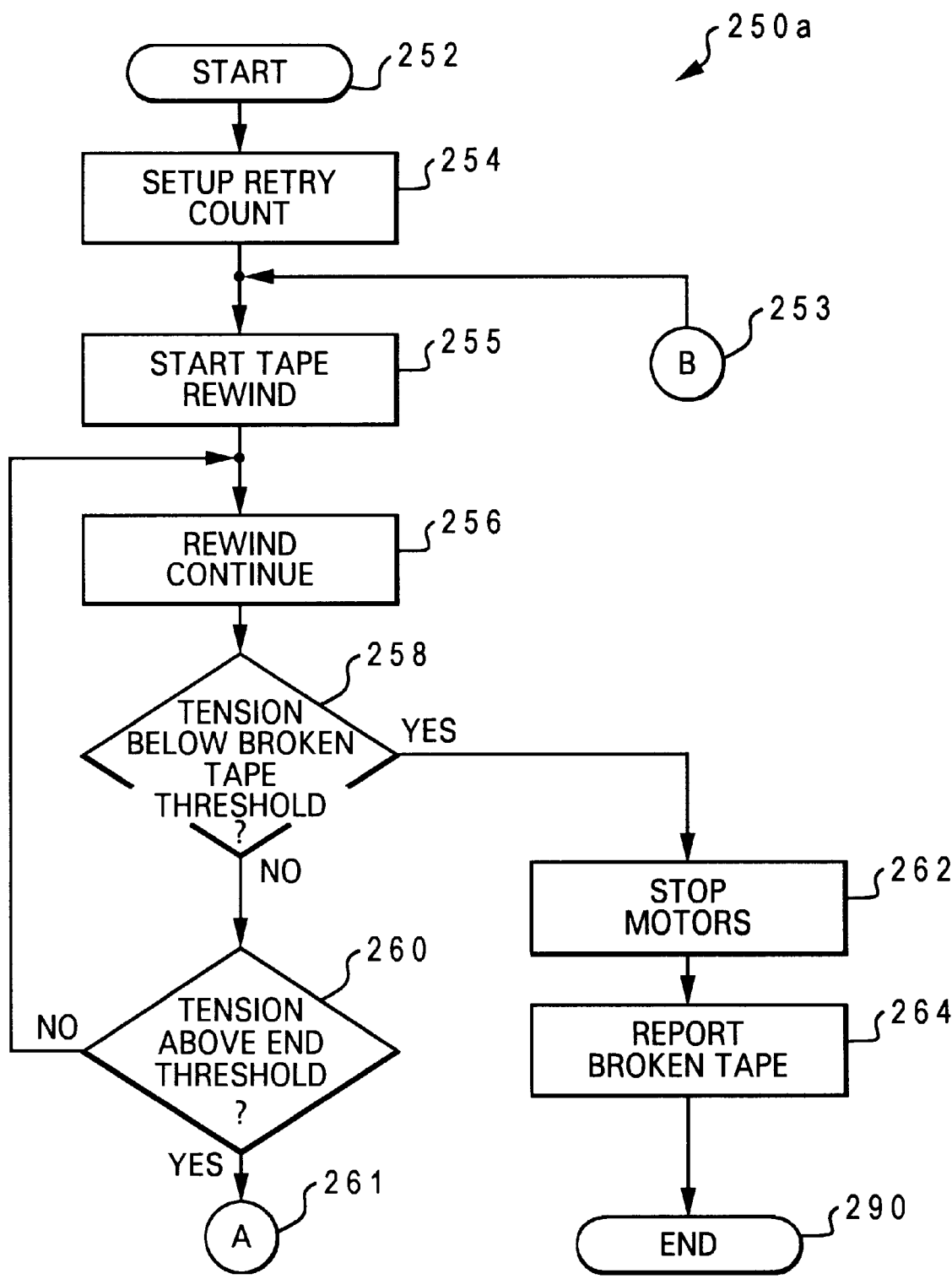
FIG. 7(a) depicts a flowchart of operations illustrating a method and system for detecting the end of a tape within a tape drive system, in accordance with a preferred embodiment of the present invention.
Figure 76:
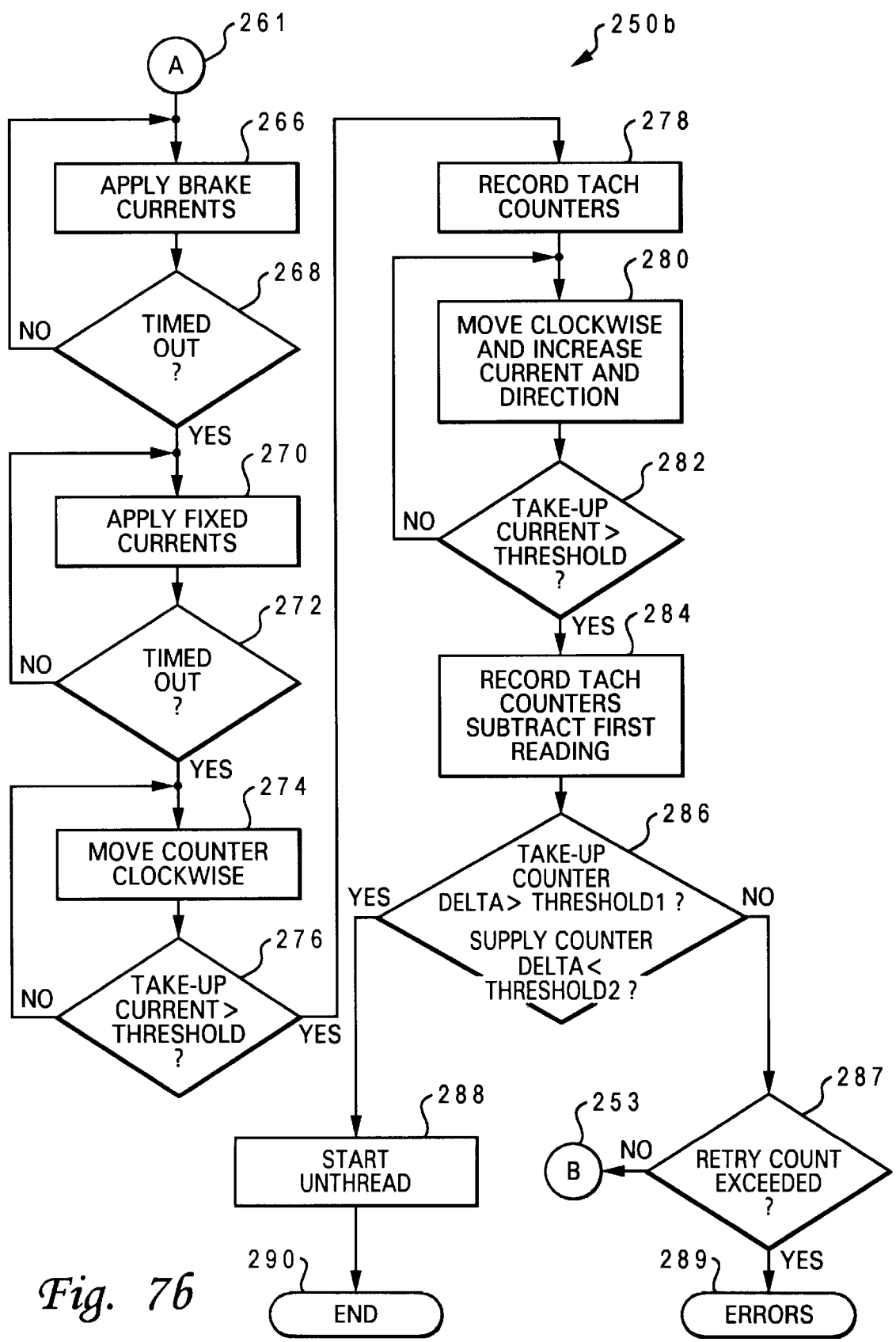

FIG. 7(a) and FIG. 7(b) depict a flowchart of operations (i.e., 250a and 250b) illustrating a method and system for detecting the end of a tape within a tape drive system, in accordance with a preferred embodiment of the present invention. In FIG. 7(a) and FIG. 7(b), like parts are indicated by like reference numerals. It can be appreciated by those skilled in the art that FIG. 7(a) and FIG. 7(b) present a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "initiating," "utilizing," "monitoring" or "driving," which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a tape drive system in processing electrical or other (e.g. mechanical, chemical) physical signals to generate other desired physical signals.

Thus, as illustrated at block 252, the process for detecting the end of a tape within a tape drive system, such as the tape drive system described and depicted herein, is initiated. As depicted at block 254, a retry count is setup. Thereafter, as indicated at block 255, a rewind operation for the tape is initiated (i.e., "start tape rewind"). Next, as illustrated at block 256, the tape continues to rewind within the tape drive system. As indicated at block 258, a test is performed, utilizing the tension transducer, to determine whether or not tension in the tape is below a "broken tape" threshold. If the tension is determined to be below the broken tape threshold, then as subsequently illustrated at block 262, the motor driving the tape through the tape drive system stops. As next described at block 264, a "broken tape" report is generated, indicating that the tape is broken. Thus, if the tape tension drops below a predetermined threshold for a predetermined period, then the system stops both reels and reports a broken tape, because the tension is out of control and too low. The process then simply terminates, as depicted at block 290. If, however, as indicated at block 258, it is determined that the tension is not below the broken tape threshold, then as indicated at block 260, a test is performed to determine if the tension is above an "end" threshold (i.e., for an "end" of tape). If it is determined that the tension is not above the "end" threshold, then the process beginning at block 256 is repeated. If, however, it is determined that the tension is not above the "end" threshold, then the process continues, as depicted at block 261, which is further depicted in FIG. 7(b).

As illustrated at block 266 in FIG. 7(b), the process continues where it left off, as depicted previously in FIG. 7(a). As indicated at block 266, brake currents are applied. Large currents are applied to the reels to brake the system and overcome the inertia of the system. As indicated at block 268, a test is performed to determine whether or not a "time out" has occurred. If a "time out" has not occurred, then the braking currents are applied again, as depicted at block 266. If a "time out" has occurred, then the process continues, as indicated thereafter at block 270 in which fixed currents are applied. Following application of the fixed currents, another test is performed, as depicted at block 272, to determine whether or not a "time out" has occurred.

If a "time out" has not occurred, then application of the fixed currents continues, as illustrated at block 270. If a "time out" has occurred, then application of the fixed currents is discontinued and the process continues, as indicated at block 274. As illustrated at block 274, the reels move counter-clockwise. Then, as indicated at block 276, a test is performed to determine whether or not the take-up current is greater than a particular threshold current. If the take-up current is not greater than the threshold current, then the operation described at block 274 is repeated. If, however, the take-up current is greater than the threshold current, then as indicated at block 278, tachometer counters are recorded. The tachometer is attached to the take-up reel.

Thereafter, as described at block 280, motion in the reels is made clockwise and an increase in current in the opposite direction is initiated. As next indicated at block 282, a test is performed to determine whether the take-up current is greater than the threshold current. If the take-up current is not greater than the threshold current, then the operation described at block 280 is repeated. If the take-up current is greater than the threshold current, then the process continues, and as illustrated at block 284, the tachometer counters are recorded, minus the first reading (i.e., the reading taken as a result of the operation performed, as described at block 278).

Next, as illustrated at block 286, a test is performed to determine whether the take-up counter delta is greater than a first threshold parameter and whether the supply counter delta is less than a second threshold parameter. If so, an unthreading of the tape is initiated, as described at block 288. The process then ends, as indicated at block 290. If not, then as indicated at block 287, a test is performed to determine whether or not a retry count has been exceed. If it is determined that the retry count has been exceeded, errors are generated, as indicated at block 289. If it is determined that the retry count has not been exceeded, then the entire process described herein is repeated, as indicated at block 253. Block 253 is also depicted in FIG. 7(a).

In the process described in FIG. 7(a) and FIG. 7(b), a tension transducer is utilized in the normal closed loop tape motion control. The tension transducer is monitored while in the normal closed loop take motion control in order to find the "end" or look for broken tape. Next, a verification test is performed to determine if the end of the tape has really been reached. This verification operation utilizes tachometers and knowledge of the path geometry. The tension transducer itself is not actually utilized in the verification test.

Thus, while the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method in a tape drive system for detecting the end of a tape within said tape drive system, wherein said tape drive system includes a take-up reel and a supply reel upon which said tape is wound, said method comprising the steps of:

driving said tape through said tape drive system at a closed loop velocity;

utilizing a tension transducer located in a path of said tape to monitor a tension associated with said tape while said tape is being driven through said tape drive system at said closed loop velocity;

moving said take-up reel through a predetermined arc of rotation, in response to a cessation of said driving of said tape through said tape drive system; and confirming that an end of tape has been detected, in response to a particular output of said tension transducer.

2. The method of claim 2 further comprising the step of:

verifying that said end of tape has been achieved, in response to an output of a tachometer attached to said take-up reel, while moving said take-up reel through a predetermined arc of rotation.

3. The method of claim 2 wherein the step of verifying that said end of tape has been achieved, in response to an output of a tachometer attached to said take-up reel, while moving said take-up reel through a predetermined arc of rotation, further comprises the step of:

verifying that said end of tape has been achieved, in response to an output of a tachometer attached to said take-up reel, while moving said take-up reel through a predetermined arc of rotation, if said output is at least equal to a predetermined threshold parameter.

4. The method of claim 3 wherein the step of driving said tape through said tape drive system at a closed loop velocity, further comprises the step of:

driving said tape through said tape drive system at a closed loop velocity, wherein said tape drive system comprises a magnetic tape drive system.

5. The method of claim 4 further comprising the step of:

determining whether a drive mechanical error has caused a false confirmation that said end of tape has been detected; and initiating a new movement of said take-up reel through said predetermined arc of movement, in response to determining whether a drive mechanical error has caused a false confirmation that said end of tape has been detected.

6. The method of claim 5 wherein the step of driving said tape through said tape drive system at a closed loop velocity, further comprises the step of:

driving said tape through said tape drive system at a closed loop velocity, wherein said tape comprises thin magnetic data storage tape.

7. A system for detecting the end of a tape within a tape drive system, wherein said tape drive system includes a take-up reel and a supply reel upon which said tape is wound, said system comprising:

means for driving said tape through said tape drive system at a closed loop velocity;

means for monitoring a tension associated with said tape while said tape is being driven through said tape drive system at said closed loop velocity, wherein said means for monitoring said tension includes a tension transducer located in a path of said tape to monitor;

means for moving said take-up reel through a predetermined arc of rotation, in response to a cessation of said driving of said tape through said tape drive system; and means for confirming that an end of tape has been detected, in response to a particular output of said tension transducer.

8. The system of claim 7 further comprising:

means for verifying that said end of tape has been achieved, in response to an output of a tachometer attached to said take-up reel, while moving said take-up reel through a predetermined arc of rotation.

9. The system of claim 8 wherein said means for verifying that said end of tape has been achieved, in response to an output of a tachometer attached to said take-up reel, while moving said take-up reel through a predetermined arc of rotation, further comprises:

means for verifying that said end of tape has been achieved, in response to an output of a tachometer attached to said take-up reel, while moving said take-up reel through a predetermined arc of rotation, if said output is at least equal to a predetermined threshold parameter.

10. The system of claim 9 further comprising:

means for determining whether a drive mechanical error has caused a false confirmation that said end of tape has been detected; and means for initiating a new movement of said take-up reel through said predetermined arc of movement, in response to determining whether a drive mechanical error has caused a false confirmation that said end of tape has been detected.

11. The system of claim 10 wherein said tape comprises thin magnetic data storage tape.

12. The system of claim 8 wherein said tape drive system comprises a magnetic tape drive system.

* * * * *